UNITED STATES PATENT OFFICE.

ALFRED GUYOT, OF SALINDRES, FRANCE, ASSIGNOR TO COMPAGNIE DES PRODUITS CHIMIQUES D'ALAIS ET DE LA CAMARGUE, OF PARIS, FRANCE, A CORPORATION OF FRANCE.

PROCESS FOR THE PREPARATION OF TRICHLORETHYLENE FROM TETRACHLORETHANE.

1,343,716.          Specification of Letters Patent.          Patented June 15, 1920.

No Drawing.          Application filed June 18, 1919. Serial No. 305,177.

*To all whom it may concern:*

Be it known that I, ALFRED GUYOT, chemist, a citizen of the Republic of France, and a resident of Salindres, Department of Gard, France, have invented a new and useful Process for the Preparation of Trichlorethylene from Tetrachlorethane, of which the following is a specification.

The transformation of symmetrical tetrachlorethane $CHCl_2.CHCl_2$ into trichlorethylene $CHCl\ CCl_2$ was observed for the first time in 1872 by Berthelot and Jungfleisch (*Ann de Phys. & Chim.*, vol. 26, page 475) in the restrained action of an alcoholic solution of potash upon tetrachlorethane; a more vigorous action transforms the trichlorethylene formed in a first phase into glycolic acid (Berthelot and Jungfleisch 1. c) or into dichlorovinic ether (Paterno and Oglialore Berl, *Ber.* vol. 7, page 81).

It has since been recognized that the alcoholic solutions of potash might be replaced by aqueous solutions of potash, and in general by aqueous solutions or suspensions of compounds having an alkaline reaction, such as soda, lime, sodium carbonate and calcium carbonate; in the absence of alcohol, the reaction is limited to the formation of trichlorethylene and the production is practically quantitative; these observations form the subject of the German Patent No. 171,900.

However among the compounds having alkaline reaction cited in the above specification, no mention is made of ammonia.

It has been recognized on the other hand, that ammonia does not react on organic compounds, and particularly on tetrachlorethane in the same manner as the alkalis. While in the case of alcoholic solutions of soda or potash the reaction proceeds too far, when an alcoholic solution of ammonia is used, the reaction halts with the formation of trichlorethylene. But the use of an alcoholic solution of ammonia has the objection that it is difficult to separate the trichlorethylene from the alcohol. I have discovered that this difficulty is removed if an aqueous solution of ammonia is used.

The invention is illustrated by the following examples:

1st example: There are introduced into a boiler furnished with a reflux condenser two parts of tetrachlorethane and two parts of water, and there is passed into the liquid a current of ammonia-gas sufficiently violent to agitate the mass; the reaction commences already in the cold, and is accelerated by heating to 60-70 degrees C.

The transformation is complete in two hours on condition of eliminating the trichlorethylene in proportion to its formation; this is effected by extracting it by an excess of ammonia-gas and maintaining the water of the condenser at a suitable temperature variable with this excess.

There are thus obtained 1.5 parts of trichlorethylene viz. a production of 96%.

2nd example: Into an autoclave provided with an agitator, there are introduced two parts of tetrachlorethane and two parts of a solution of ammonia of density 0.91. After having heated for three hours at a temperature comprised between 140 degrees and 170 degrees C. there are obtained by distillation 1.430 parts of trichlorethylene, viz. a production of 92%.

Having now particularly described and ascertained the nature of my said invention and in what manner the same is to be performed I declare that what I claim is:—

1. A process for the transformation of tetrachlorethane into trichlorethylene which comprises the step of subjecting tetrachlorethane to the action of an aqueous solution of ammonia.

2. A process for the transformation of tetrachlorethane into trichlorethylene, consisting in bubbling a current of ammonia gas into tetrachlorethane mixed with water and subjected to the action of heat, and in extracting by ammonia gas in excess the trichlorethylene as it is formed.

3. A process for the transformation of tetrachlorethane into trichlorethylene, consisting in heating a mixture of tetrachlorethane water and ammonia.

In testimony whereof I have signed my name to this specification.

ALFRED GUYOT.

Witnesses:
  A. YEAZ,
  A. GUILLOT.